Figure 1:
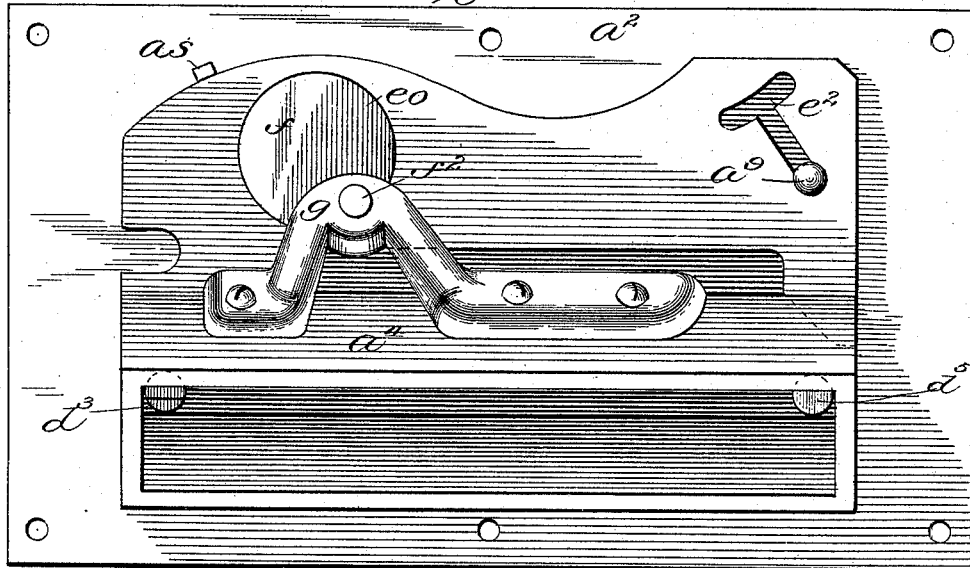

(No Model.) 3 Sheets—Sheet 1.

W. E. HUBER.
LETTER BOX.

No. 585,577. Patented June 29, 1897.

Witnesses
Harry S. Rohun
Arthur Ashby

Inventor
William E. Huber (No Model.)
3 Sheets—Sheet 2.
W. E. HUBER.
LETTER BOX.
No. 585,577.
Patented June 29, 1897.
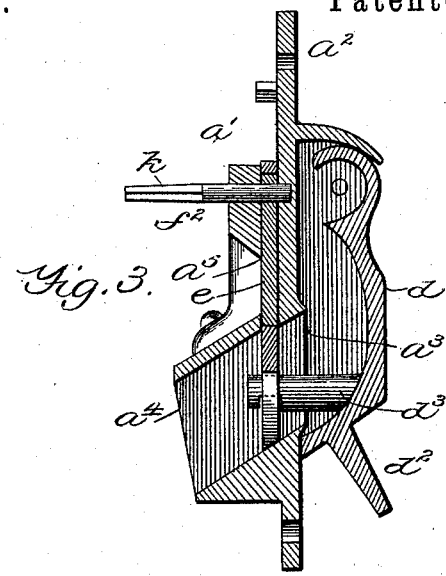
Fig. 3.
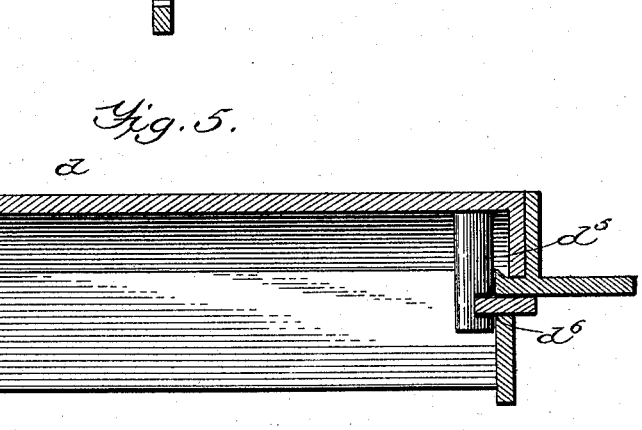
Fig. 5.
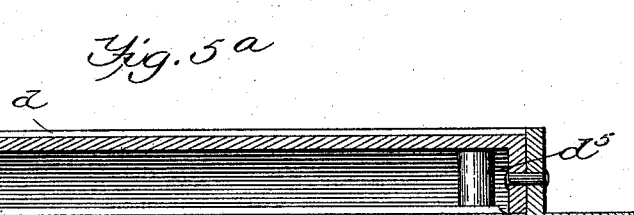
Fig. 5a.
WITNESSES:
Harry S. Rohun
Arthur Ashley
INVENTOR
William E. Huber
BY
ATTORNEY (No Model.)  3 Sheets—Sheet 3.
W. E. HUBER.
LETTER BOX.
No. 585,577.  Patented June 29, 1897.
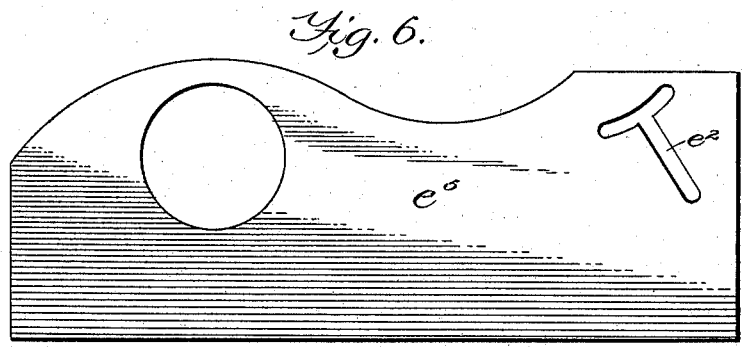
Fig. 6.
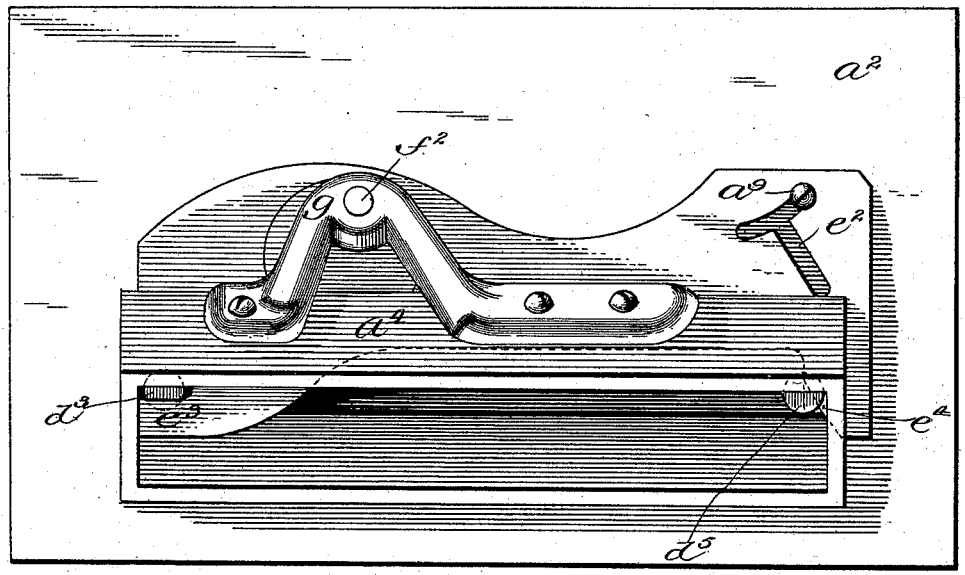
Fig. 7.
WITNESSES:
INVENTOR
William E. Huber
BY
ATTORNEY

UNITED STATES PATENT OFFICE.

WILLIAM E. HUBER, OF KANKAKEE, ILLINOIS, ASSIGNOR TO HENRY J. ERZINGER, OF CHICAGO, ILLINOIS.

LETTER-BOX.

SPECIFICATION forming part of Letters Patent No. 585,577, dated June 29, 1897.

Application filed August 21, 1896. Serial No. 603,497. (No model.)

*To all whom it may concern:*

Be it known that I, WILLIAM E. HUBER, a citizen of the United States, and a resident of Kankakee, in the county of Kankakee, in the State of Illinois, have invented certain new and useful Improvements in Letter-Boxes and the Like, of which the following is a correct description.

The special object of the invention is to provide, in connection with the opening of a letter-box or other like receptacle into which mail-matter or other articles may be dropped or slid, a ready means whereby when for any reason it is desired that the use of such box or receptacle shall be temporarily or permanently discontinued the opening thereof may be instantly and effectually closed from the inner or receiving side of the car, door, office, or apartment in connection with which such letter-box is employed.

With this object in view the invention consists in the provision, in connection with a door, wall, or other vertical surface which has a letter or other like opening through which letters or other matters are to be thrust or dropped from the exterior side of such door or surface, of a closing plate or slide which is loosely secured upon the inner side or face of the door or surface in which such opening is formed and which is operated by an eccentrically-pivoted plate or lever to move the closing-slide either into its closed or into its open adjustment.

The invention consists also in the combination, with a door or wall which is provided with a letter or like opening and which is provided also with a pivoted self-closing flap or drop-door, of an engaging plate which is loosely mounted upon the inner surface of the door or wall and which when the flap or drop-door is in its closed position is adapted to be moved into engagement with the flap or door and to maintain it in its closed adjustment.

The invention consists also in the combination, with an apartment or inclosure which has a letter-opening and an exterior pivoted weather-guard or drop-door, which is closable by its own weight to cover such opening, of a bodily-movable slide or plate which is mounted upon the inner face of such apartment or inclosure and which is adapted to interlock with the self-closing weather-guard or drop-door and to maintain it in its closed and covering position.

The invention consists also in various novel parts or combinations of parts in or in connection with a letter-box or letter-opening, as will first be described with particular reference to the details of construction and then specifically and distinctly claimed in the paragraphs which succeed such detailed description.

Figure 2:
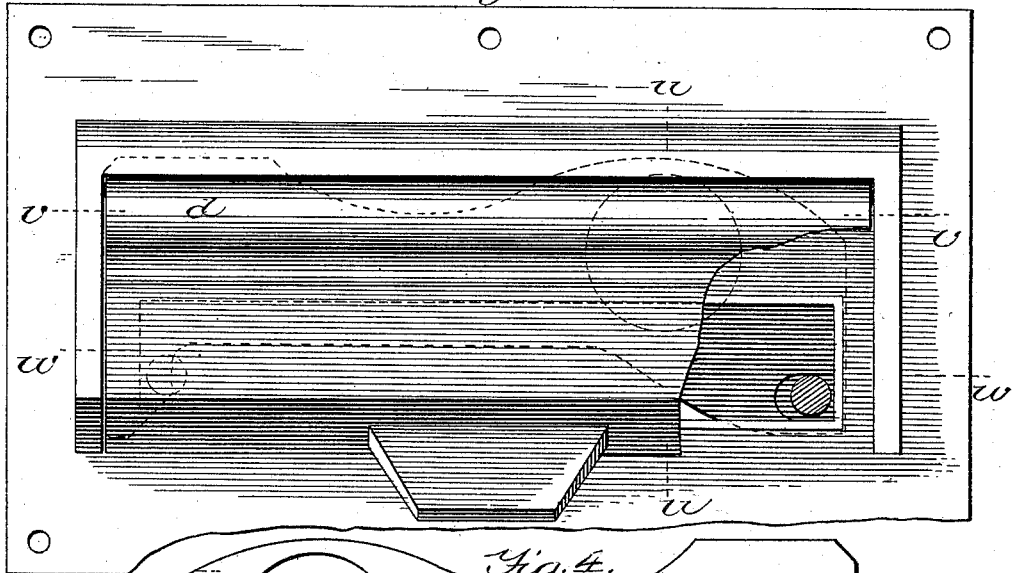
Figure 4:
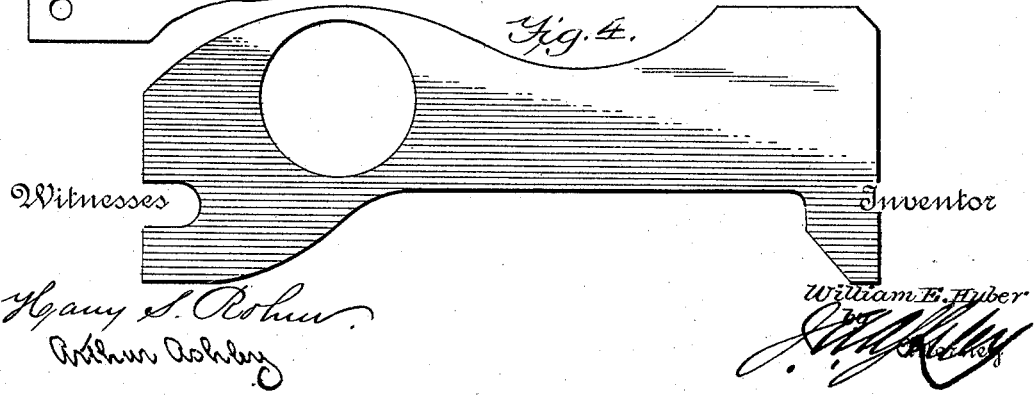

In the accompanying drawings, which constitute a part of this specification, Figure 1 represents a view in elevation, showing the inner face of a letter-box plate or frame to which the cover-engaging slide is applied, the slide being represented in its elevated or disengaged position. Fig. 2 is an elevation showing the opposite or outdoor side of the plate or frame and its attachments, a portion of the weather-door being broken away and the slide having been moved to its engaged position. Fig. 3 is a vertical transverse section as in the line $u\,u$ of Fig. 2. Fig. 4 is a plan of the engaging slide detached. Fig. 5 is a horizontal section in the line $v\,v$, and Fig. $5^a$ is a horizontal section in the line $w\,w$, of Fig. 2. Fig. 6 represents a plan view of the covering-slide detached. Fig. 7 is an elevation similar to that represented in Fig. 1, but showing the engaging slide as when moved downward to its engagement with the lugs upon the pivoted flap or weather-door.

Referring now more in detail to the drawings, it will be understood that the plate or frame $a^2$ and the letter-opening $a^3$ of the letter-box $a$ may be of ordinary construction. The chute $a^4$ also is similar to that ordinarily provided, but in its upper and inner portion it is cut away or recessed to provide a path or way $a^5$ for the movement of the engaging slide. The guard or weather-door $d$ is pivotally mounted in bearings formed in the housing or frame $a^6$ and has lifting-lug or thumb-piece $d^2$. Upon its inner hollowed surface the door is provided with horizontally-projecting lugs $d^3$ and $d^5$, the latter having a lateral recess and corresponding terminal projection $d^6$ and the former having a lateral projection $d^4$ and a bottom recess and terminal projection $d^8$. The engaging slide $e$ is received and has its movement within the way $a^5$ between the chute $a^4$ and the plate or frame $a^2$. It is limited in its movement toward the left by the stop $a\,s$ upon the frame $a^2$. It is guided by a stud $a^9$, which is embraced within the T slot or opening $e^2$ in the body of the engaging slide. It is provided in its left upper portion with a circular opening $e\,o$, and it is actuated by the circular eccentric $f$, which is fitted within the opening $e\,o$, and the stem or shaft $f^2$ of which is pivotally received in a bearing frame or standard $g$, which in the drawings is shown as supported upon the chute $a^4$, but which may, if desired, be supported in a longitudinal frame or cross-bar, the ends of which will be rigidly attached to the corresponding ends of the plate or frame $a^2$.

A suitable key or turning-handle $k$ being applied upon the spindle or shaft $f^2$ of the lever or eccentric $f$ and the flap or weather-door $d$ being closed the engaging slide $e$ will, if in its elevated position, be moved first toward the right and downwardly and then toward the left and downwardly until it is brought to rest with its left terminal projection $e^3$ in locking engagement with the lug $d^3$ upon the door $d$ and with its right terminal projection $e^4$ in similar engagement with the lug $d^5$ upon such door. A reversal of the described movement operates, as will be obvious, to disengage the terminals $e^3$ and $e^4$ and to permit the door to be freely lifted from its seat within the casing or housing.

Under the construction represented in Fig. 6 the slide $e^5$ itself is in precisely the same manner operated to cover the letter-opening, the lower portion of the slide being left plain or unrecessed and the weather door or guard being unprovided with engageable lugs or projections of any kind.

Although I have in connection with this specification represented what I believe to be a new and useful mechanical movement, I do not herein make broad claim of novelty therefor, the same being independently presented in an application filed August 21, 1896, and serially numbered 603,496, for a "Mechanical movement."

The invention having been thus described, what is claimed is—

1. The combination with a door or wall which is provided with a letter-opening, and which is provided also with a hinged self-closing flap or weather-door; of an engaging plate which is loosely mounted upon the inner surface of the door or wall, and which, when the flap or weather-door is in its closed position, is adapted to be moved into engagement with such flap or door, and to maintain it in its closed adjustment.

2. The combination with an apartment or inclosure which has a letter-opening, and an exterior hinged weather-guard or drop-door which is closable by its own weight, to cover such letter-opening; of a bodily-movable slide or plate which is loosely secured upon the inner face of such apartment or inclosure, and which is adapted to interlock with the self-closing weather-guard or drop-door, and to maintain it in its closed and covering position.

3. The combination with an apartment or inclosure which is provided with a letter-receiving opening, of an interior slide which is loosely mounted upon the inclosure, and which is operated in relation to the letter-receiving opening, by an eccentric which is received within the body of the slide; substantially as set forth.

4. The combination with an apartment the door or wall of which is provided with a letter-opening; of a closing plate or slide which is loosely secured upon the inner surface of such door or wall, and which is actuated by an eccentric, within the plate or slide, to move the same, to cover or to uncover the letter-opening; substantially as specified.

WILLIAM E. HUBER.

Witnesses:
L. W. WHEELER,
J. BERT. MILLER.